May 26, 1931.  W. S. WITTEN  1,807,188
STOCK PEN
Filed Aug. 1, 1928   4 Sheets-Sheet 1

Fig. 1.

May 26, 1931. W. S. WITTEN 1,807,188
STOCK PEN
Filed Aug. 1, 1928 4 Sheets-Sheet 2

May 26, 1931.  W. S. WITTEN  1,807,188

STOCK PEN

Filed Aug. 1, 1928  4 Sheets-Sheet 3

Patented May 26, 1931

1,807,188

UNITED STATES PATENT OFFICE

WILLIAM S. WITTEN, OF PASADENA, CALIFORNIA

STOCK PEN

Application filed August 1, 1928. Serial No. 296,702.

This invention has to do with the construction of pens for holding animals in stock yards, including the provision of means for feeding and watering the cattle or other animals confined in them. As is generally known, the stock yards found at the larger markets for cattle, sheep, hogs and horses, are made up of a greater or less number of pens arranged in blocks with alleys between the several blocks, these pens and alleys being equipped with gates arranged so that when the alleys are used as runways for the animals, by suitably manipulating the gates the animals may be directed to the several pens, to a particular pen or block of pens, to or from railway cars, or to slaughtering establishments. At times the alleys are jammed with cattle moving more or less rapidly and crowding against one another, so that the outer walls or fences of the pens that border on the alleys are subjected to great strains from the cattle bumping or rubbing against them, and frequently the boards are broken, which not only increases the cost of maintenance but is also likely to result in injury to animals from broken boards that project into the alleys or into the pens.

Also, the pens are frequently filled to capacity, and the fencing is apt to be damaged by the movements of the animals, which are sometimes quite violent. Cattle particularly are more or less disposed to fight, and with the pen construction heretofore used, in which the fences or walls are practically rigid or unyielding, the boards are very likely to be broken because of being bumped by cattle confined in the pens. Furthermore, the tops of the fences are generally used as runways for employees and others inspecting the cattle or pens. Therefore, it is important that the fences be substantially constructed and provided with suitable plank walks along which persons may walk to go from one pen to another in the same block without using the alleys or getting down into the pens, and yet be capable of yielding under pressure sufficiently to avoid breakage.

Another very important consideration in the operation of stock yards is the matter of cleanliness. For economic reasons, as well as for the comfort and health of the employees and animals, it is desirable to keep the pens and alleys as clean as possible, while at the same time making provision for watering and feeding the animals expeditiously and economically. Therefore, it is desirable that the fencing, water troughs and mangers be so designed that the pens may be easily and thoroughly cleaned; that water may be readily supplied to the troughs, and feed to the mangers, and that these parts be so arranged and constructed that they will not be liable to rot or to be damaged by the animals using them.

The object of my invention is to provide certain improvements in construction by which the several desirable qualities above mentioned may be realized, and also by which the cost of installation of the pens and equipment may be materially lessened by reducing the amount of lumber required in the construction of a block of pens, while at the same time increasing the capacity of the pens without increasing the outside dimensions of the block as a whole. I accomplish this object as illustrated in the drawings and as hereinafter described. What I regard as new is set forth in the claims.

In the accompanying drawings.

Figure 1:
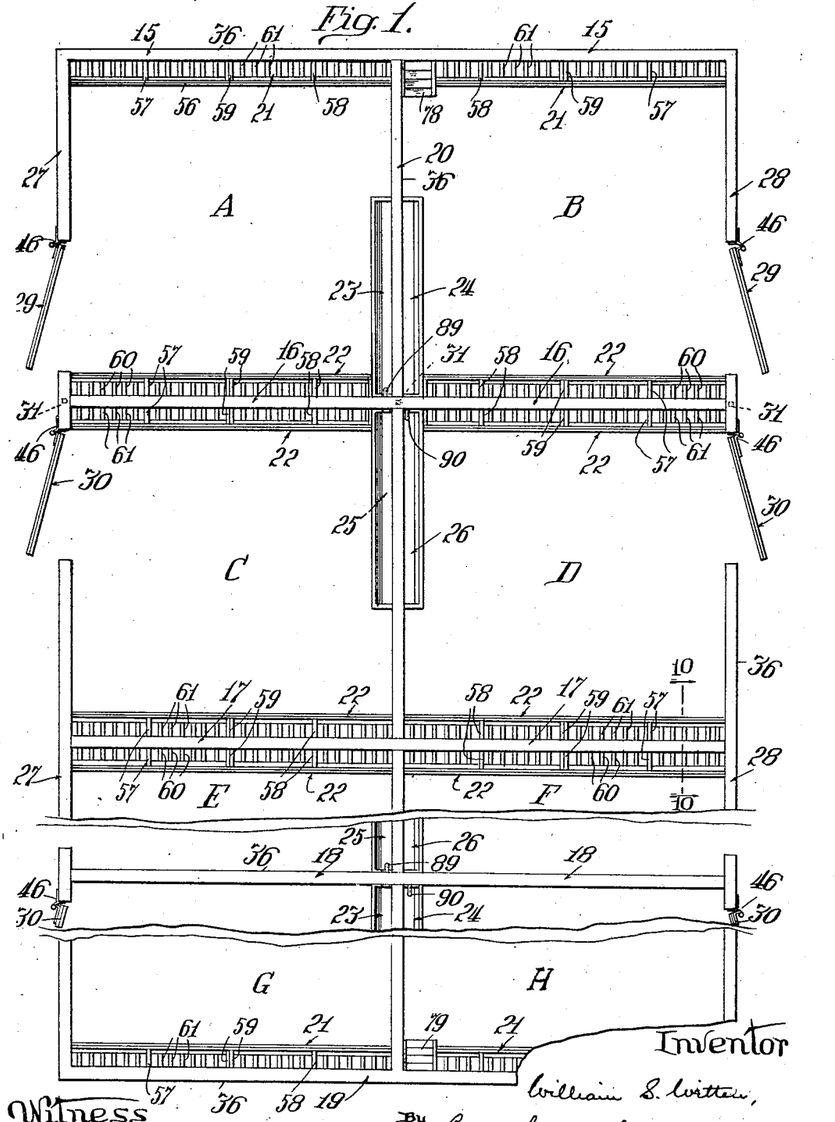
Fig. 1 is a plan view of a block of eight pens, parts of one half of the block being broken away.

Referring to the drawings, the general arrangement of a block of eight pens is best shown in Fig. 1, from which it will be seen that the block is an oblong, being two pens wide and four pens long. As will be understood, there is usually an alley along each of the four sides of the block, but in the construction illustrated gates are provided only at the sides of the block, one for each pen, which afford access to the side alleys. In each pen are two mangers placed along its transverse walls, and a water trough that extends a greater or less distance along its longitudinal inner wall. This arrangement is clearly shown in Fig. 1, in which 15 indicates the outer transverse wall of the two end pens A, B, 16 an intermediate transverse wall or fence that forms a partition between end pens A and B and intermediate pens C and D. 17 is another intermediate transverse wall that separates pens C and D from intermediate pens E and F, and 18 a further transverse wall that separates pens E and F from end pens G and H. 19 indicates the transverse end wall at the opposite end of the block from the wall 15.

A central longitudinal partition or wall 20 separates pens A, C, E and G, respectively, from pens B, D, F and H. The mangers above referred to extend along the inner sides of the walls 15 and 19 and along both sides of the walls 16 and 17. The mangers along the end walls 15 and 19 are indicated by reference numerals 21, and those along the intermediate walls by reference numerals 22, the former being single and the latter double, as will be hereinafter more particularly described. The water troughs extend along both sides of the longitudinal partition 20 and are arranged in groups of four, such groups being composed of two pairs of troughs arranged end to end with one trough in each pen. The troughs in pens A and B constitute one pair and are indicated by the reference numerals 23, 24, and those in the pens C and D constitute another pair, indicated by reference numerals 25, 26. The troughs in pens E, F, G and H are indicated by corresponding reference numerals. The outer side walls of the several pens constituting the block are indicated by reference numerals 27, 28, and these are provided with outwardly swinging gates 29, 30 suitably hinged so that they may be swung from their closed position preferably back into parallelism with the side walls 27, 28, thereby leaving the alley practically unobstructed when the gates are opened to the fullest extent. They may also be swung across the alley to direct animals into the pen with which they are connected, when that is desired.

Figure 4:
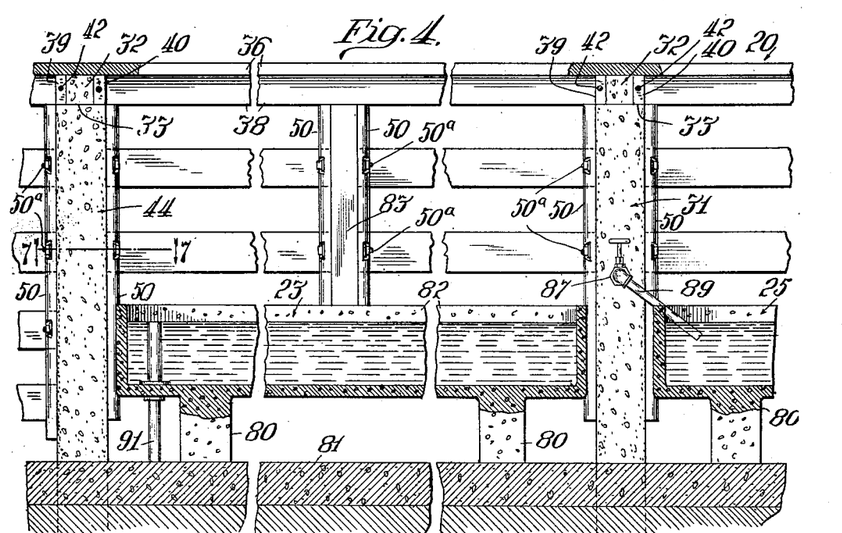
Fig. 4 is an enlarged view in elevation taken on line 4—4 of Fig. 2, and showing more particularly the arrangement of the watering troughs and the means for supplying water thereto.
Figures 5, 6, 7:
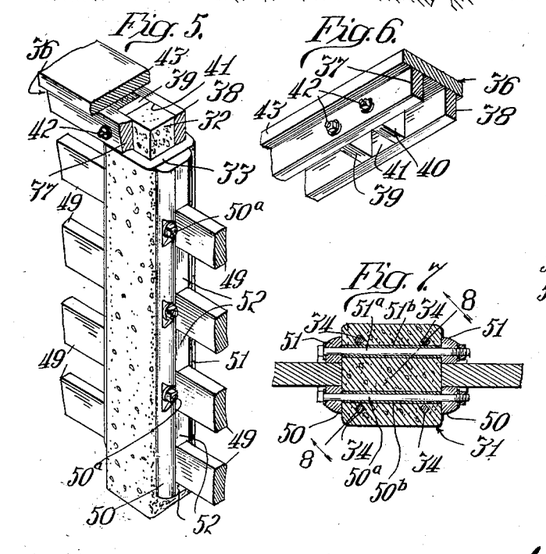
Fig. 5 is a perspective view illustrating the fence construction, one of the intermediate posts and the parts connected therewith being shown.
Fig. 6 is a perspective view of parts of one of the trusses that constitute the top rail and running board of the fence.
Fig. 7 is a horizontal sectional view on line 7—7 of Fig. 4.
Figure 8:
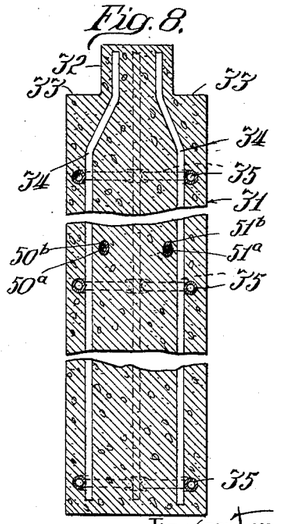
Fig. 8 is a vertical sectional view of one of the fence posts taken on the line 8—8 of Fig. 7.

Considering now the construction of the outer walls or fences of the block,—which, in so far as is appropriate, is also carried into the cross partitions or fences between pens,—at each corner of the block, and also at each of the other corners of the individual pens, I provide a reenforced concrete post 31 which is anchored in the ground in any suitable way so that it is firmly held in an upright position. Each of these posts is square in cross-section, and at its upper end is provided with a square tenon 32, best shown in Fig. 8, which is equal in height to the width of the top rails of the fencing as hereinafter described. Thus I provide a shoulder 33 at the upper end of the post, around the base of the tenon 32, on which such top rails rest. The shoulders 33 correspond in width to the width of the top rails, as best shown in Figs. 4 and 5. Reenforcement of the posts is provided by a number, preferably 4, of rods 34 that extend longitudinally of the post adjacent to its corners, as shown in Fig. 7, and at their upper ends converge and extend up into the tenon 32, as shown in Fig. 8. The several reenforcing rods 34 may be cross-connected by bracing rods 35, indicated by dotted lines in Fig. 8.

Secured upon the tops of the posts 31 by means of the tenons 32 are longitudinally extending fence members or trusses indicated as an entirety by the reference numeral 36, the construction of which is best shown in Fig. 6. Each of these trusses comprises two parallel top rails 37, 38 that are spaced apart a distance equal to the thickness of the tenon 32 so that they are adapted to fit closely against opposite sides of the tenon.

Preferably these rails are two by four joists, and they are held in spaced relation to each other by spacing blocks 39, 40 spaced apart a distance equal to the thickness of the tenon 32, thereby forming a square recess 41 in which the tenon 32 is adapted to fit. Transverse bolts 42 that extend through the rails 37, 38 and through the spacing blocks 39, 40 brace the parts together and hold said blocks firmly in position. A running board 43, which is preferably a two by eleven plank, is secured upon the upper margins of the rails 37, 38.

Figures 2, 3:
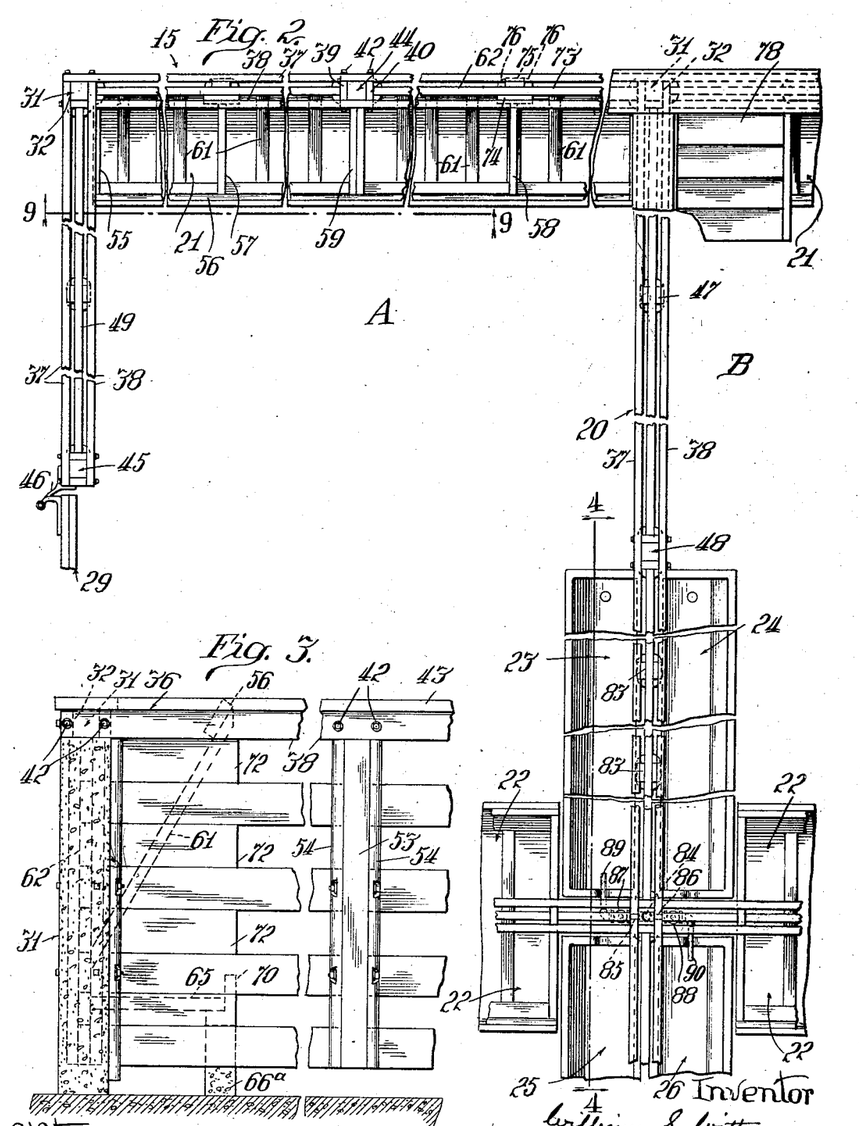
Fig. 2 is a somewhat larger plan view of parts of four pens, also having some parts broken away.
Fig. 3 is a partial side elevation of one corner portion of the block with some parts broken away.

The trusses above described may extend continuously between the corner posts 31, or if desired they may be intermediately supported by posts 44 located preferably midway between the corner posts at the ends of the pens, the top rails and running boards being joined at those points. Also, at the sides of the block gate posts 45 are provided at the gate openings to support the adjacent ends of the trusses and also to carry the gate hinges 46, as shown in Fig. 2. Intermediate posts 47, 48 may also be provided to support the longitudinally extending trusses, as shown in the latter figure.

The several posts also serve to support fence boards 49, which are preferably two by sixes whose length is equal to the distance between adjoining posts, so that they may lie between the posts with their ends abutting against them, as best shown in Figs. 2 and 7.

The ends of the fence boards fit between two parallel quarter round strips 50, 51 that are secured to a face of the post in spaced relation to each other, so that they are adapted to receive the ends of the fence boards between them, as shown in Figs. 5 and 7, and between these quarter round strips are a series of filler blocks 52 fitted between consecutive fence boards to aid in holding the boards in spaced relation to each other and keep out storm water, etc. The boards may be fastened to the quarter round strips by nailing or in any other suitable way, or, as the filler blocks provide an adequate support for them, they need not be directly fastened to the strips 50, 51. In the case of the intermediate posts or the corner posts between pens, where fence boards abut against opposite sides of the post the quarter round strips 50, 51 are provided at opposite faces of such posts, as shown in Figs. 5 and 7, but in the case of the posts at the corners of the block, where the fence boards at the ends and sides are at right angles to each other, as shown in Fig. 2, the quarter round strips are placed along adjacent side faces of the posts. In the case of the corner posts between pens, such strips may be provided on three or four of the side faces of the posts as may be required, and as indicated in Fig. 2. Where the quarter round strips are secured to opposite sides of the posts, as shown in Fig. 7, the two strips at the same side of the fence are secured together and to the post by bolts 50ª, 51ª which preferably extend through sleeves or short pipes 50ᵇ, 51ᵇ embedded in the post to protect the concrete against wear. This arrangement may be used wherever bolts extend through the concrete.

As shown in Fig. 3, about midway between consecutive posts the fence boards are connected together at both sides of the fence by vertical boards 53 that are secured to them in any suitable way, as by nailing, and extend up into the space between the top rails. These boards 53 are protected at their edges by quarter round strips 54 so that they are not likely to be damaged by the animals or are not apt to injure them. The boards 53 do not extend below the lower margins of the bottom fence boards, but terminate clear of the ground, and consequently the fence is left free to flex laterally to a considerable extent under pressure of the animals. The several fence boards being connected together, pressure against one of the fence boards is transmitted through the boards 53 to all the other boards connected with them, so that the strain is distributed and any given board is not easily broken. The capacity of the fence to yield under pressure also tends to prevent breakage. The upper ends of the boards 53 are not rigidly connected with the truss, so that their lower ends may swing to accommodate the flexing of the fence.

From the foregoing description it will be seen that instead of making the fence of two series of spaced fence boards disposed in parallel vertical planes at opposite sides of fence posts secured in the ground, as has heretofore been the general practice, I provide a fence that is made up of a single series of spaced boards in the same vertical plane and supported, at their ends only, on posts secured in the ground, thereby not only materially reducing the quantity of lumber required and cheapening the cost of construction by reducing the cost of labor and materials, but also increasing the capacity of the pens to the extent of approximately half the space between the opposite fence boards that in prior constructions was wasted.

Furthermore, my improved construction to a great extent avoids danger of breakage and of injuring the animals. By providing the truss construction the top members of the fencing around each pen are braced together, taking the strain off the posts, and by securing the truss members to the posts in the manner described no damage is done to the posts. If one of the fence boards should be broken, it is easily replaced, as the quarter round strips are bolted to the posts, and, therefore, may easily be removed when necessary.

Figure 10:
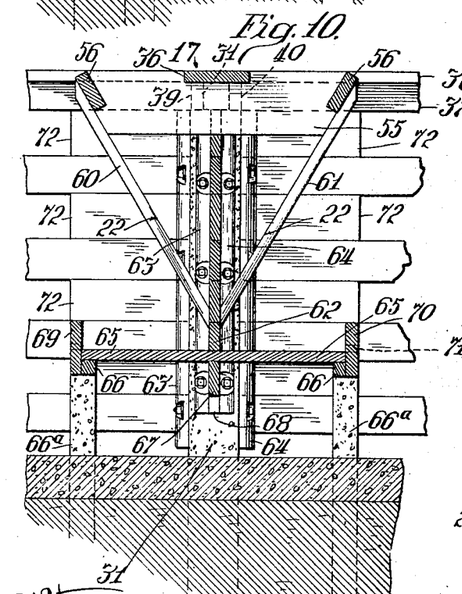
Fig. 10 is a vertical cross-section on line 10—10 of Fig. 1, illustrating details of the manger construction.
Figure 11:
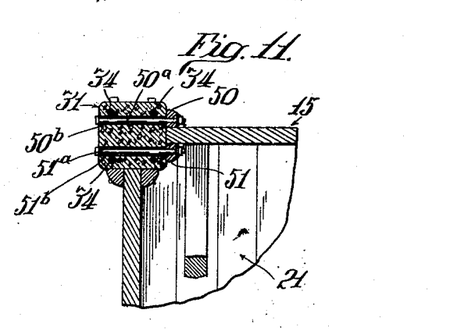
Fig. 11 is a partial horizontal section on line 11—11 of Fig. 9.

The construction of the double mangers 22, which, as has been explained, extend along opposite sides of the transverse partitions 16, 17, is best shown in Figs. 1 and 10. As shown by dotted lines in Fig. 1, there is a post 31 at each end of the transverse partition 16 and at the middle of said partition, and the usual trusses 36 and running boards 43 compose the top of the partition. At the end of the manger adjacent to the side wall of the block a spreader board 55, preferably a two by ten plank, is secured in a horizontal position to the inner side of the truss member, said spreader board being notched centrally to receive the running board 43, as shown in Fig. 10, so that it extends an equal distance at opposite sides of said running board. The ends of the spreader board are mitered to converge downwardly, and secured to such mitered ends are two longitudinally extending bars 56, preferably two by sixes, which extend the full length of the manger and are secured to a similar spreader board at the opposite end thereof, the latter spreader board being secured in any suitable way.

In the case of the mangers at opposite sides of the transverse partition 17 the inner spreader boards are secured directly to the truss members of the partition, but in the case of the mangers associated with the transverse partition 16 the spreader boards at the inner ends of the mangers are secured to the truss member of the partition 16 far enough from the center post 31 to allow room for the water troughs, the inner ends of which extend between the inner ends of the mangers at opposite sides of the longitudinal partition 20, as best shown in Fig. 1. The transverse truss members at this point are, however, extended to the post 31 that lies between the inner ends of the water troughs and the inner ends of the mangers, and fencing extends under said truss members between the two adjoining ends of the mangers, to avoid leaving an opening between the inner ends of two sets of water troughs. This fencing may be of the same construction as that used in other places, as already described.

Intermediate spreader boards may also be provided, as shown at 57, 58 and 59 in Fig. 1, the latter being preferably double to give additional strength, as shown in said figure. Fastened to the end portions of the several spreader boards and to the bars 56 are downwardly converging strips 60, 61 which come together near the bottom of the manger and are secured, as by nailing, to the lower boards of a central vertical partition 62 that forms a division wall between the two portions of the double manger between two adjoining pens. These partition boards 62 rest one upon another and form a practically tight partition.

Figure 9:
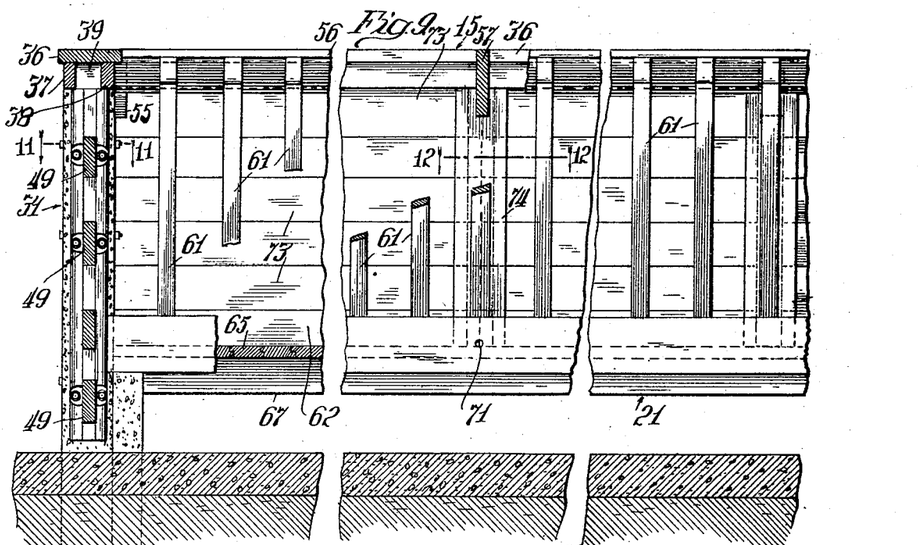
Fig. 9 is an elevation, partly in section on line 9—9 of Fig. 2, showing the inner corner, of one of the pens and the manger construction.

They are not permanently fastened in place, but their ends lie between vertical quarter round strips 63, 64 secured to the posts 31, and consequently they may be easily installed or removed. As shown in Fig. 9, the several inclined strips 60, 61 are spaced far enough apart to enable the animals to get at hay or other like feed placed in the upper parts or feed racks of the manger, which are open at the top so that they may easily be supplied with the feed. The floor or bottom of each manger is made up of matched planks 65, as shown in Figs. 9 and 10. In the case of the double mangers these planks extend across under both feed racks, as shown in the latter figure. They are supported at their ends by joists 66 carried on short concrete posts $66^a$, and intermediately they rest on a joist 67 secured to the post 31 by means of the quarter rounds 63, 64 and filler blocks 68 secured to said quarter rounds as shown. Marginal boards 69 and 70 are fastened to the ends of the floor boards 65 and project up high enough below the bottom of the manger to form feed troughs to receive grain or other feed that cannot suitably be placed in the feed racks. To aid in keeping the feed troughs dry, the marginal boards 69, 70 are provided with drainage holes 71, as shown in Figs. 9 and 10, located about on a level with the bottom of the manger.

To prevent feed in the mangers from being scattered out into the alleys at the outer ends of the mangers, the outer fencing is preferably closed at those points by inserting additional short boards 72 between the regular fence boards opposite the manger ends, as shown in Fig. 10, so as to make a tight wall.

These additional boards are held in place by inserting their inner ends between the vertical quarter round strips that hold the fence boards in place, and if desired they may be further secured by nailing or in any other suitable way.

Figure 12:
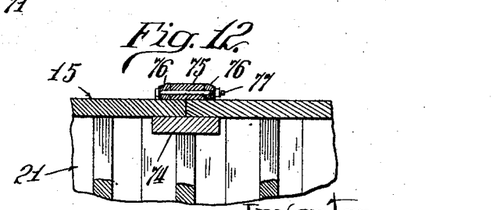
Fig. 12 is a partial horizontal section on line 12—12 of Fig. 9, showing further details of the manger construction.

The mangers that extend along the end walls 15, 19 of the block of pens are constructed like the others, except that they are single instead of double, and as they extend along the outer walls of the pens the spaces between the regular fence boards are filled by inserting additional planks 73 between such fence boards, held in place in the same way. The spreader boards for these mangers, of course, are beveled at one end only, and are enough shorter than the spreader boards 55 to adapt them for use in this location. If it be desired to use boards shorter than the full length of the mangers the abutting ends of such shorter boards may be supported and braced by vertical boards 74 on the inside, and similar boards 75 on the outside having their edges rounded by providing quarter round strips 76 connected by bolts 77, as shown in Fig. 12. These outside strips may, however, be made integral and provided with rounded edges, if preferred.

In Fig. 1 I have shown steps 78, 79 as leading down into pens B and H between the inner ends of the mangers along the outer walls of said pens and the longitudinal partition, to provide convenient access to such pens from the running board. Where these steps are provided the spreader boards at the inner ends of such mangers are not secured directly to the longitudinal partition, but are fastened to the framework supporting the steps and to the truss members at the ends of the block of pens.

As has been explained, each group of four pens is provided with four water troughs 23, 24, 25, 26 arranged in pairs, the troughs 23, 24 constituting one pair, and the troughs 25, 26 the other. The proximate ends of the two pairs of troughs extend between the inner ends of the double mangers in such group of pens and lie at opposite sides of and adjacent to the center post 31 of such group. These troughs are preferably made of concrete and are supported by pedestals 80, preferably integral therewith, which rest on the concrete floor 81 of the pen, as best shown in Fig. 4. The troughs of each pair are separated by a longitudinal partition 82, and the fencing that makes up the longitudinal partition 20 overlies this partition and is intermediately supported thereon by a wooden or concrete post 83 that rests on the partition 82, as shown in said figure. Water is supplied to the several troughs of each group of four from a common source of supply in the form of a pipe 84 that extends up through the center post 31 and is provided with two oppositely extending arms 85, 86 provided respectively with valves 87, 88, and with swiveled branch pipes 89, 90, best shown in Figs. 2 and 4. The pipe arms 85, 86 extend in opposite directions from the supply pipe 84, between the adjoining ends of the pairs of troughs, and the branch pipe 89 is arranged to be swung into position either to supply the trough 23 or the trough 25. In like manner the branch pipe 90 may be swung into position to supply either the trough 24 or the trough 26. Thus I provide for admitting water to either or all of said troughs from a single supply pipe.

Each trough is provided with an overflow pipe 91, shown in Fig. 4, to prevent water from overflowing upon the floor of the pen. As the troughs are supported above such floor on the concrete pedestals 80 it is a simple matter to keep the pens clean and sanitary, as there are no pockets or other places of refuge for rats and other vermin, or for the accumulation of refuse matter. Also, there are no wooden posts that rest on the ground or are otherwise located so that they are apt to rot. By extending the water supply pipe through a hole in the center post it is not only braced by the post but it is protected from damage by the animals, and is prevented from injuring them.

In addition to the advantages that have been mentioned, my improved construction makes it practicable to rearrange the pens without damaging the material used in their construction, as only a few nails are used in the center of the fences between posts, and consequently the value of the lumber is not impaired. The fences can be taken down in sections and rearranged without difficulty.

What I claim as my invention and desire to secure by Letters Patent, is—

1. A block of pens for confining animals comprising four outer walls, partitions dividing the space between said outer walls into a group of rectangular pens, and posts at the points of juncture of said walls and partitions, the top members of said walls and partitions being in the form of parallel trusses that extend over and are clamped to said posts.

2. A rectangular pen for confining animals comprising upright posts having tenons at their upper ends, and walls connected with and supported by said posts, the top members of said walls being composed of parallel rails spaced apart to receive said tenons between them, means for clamping the rails to the tenons and horizontally disposed planks secured upon said rails.

3. A rectangular pen for confining animals comprising a plurality of upright posts having tenons at their upper ends, and walls connected with and supported by said posts, the top members of said walls being composed of parallel rails spaced apart to receive said tenons between them, transverse spacing blocks between said rails forming pockets for said tenons, and horizontally disposed planks secured upon said rails.

4. A rectangular pen for confining animals comprising a plurality of upright posts, and walls in the form of spaced fence boards butted against the faces of said posts and supported thereby at their ends only to enclose said pen, the intermediate portions of said boards being adapted to flex laterally, and means connecting said boards together intermediately of their length.

5. A rectangular pen for confining animals comprising a plurality of upright posts, and walls in the form of spaced fence boards supported at their ends only between the opposite faces of adjoining posts by means attached to said faces, the intermediate portions of said boards being adapted to flex laterally, and means connecting said boards together intermediately of their length.

6. A rectangular pen for confining animals comprising a plurality of upright posts, and walls in the form of spaced fence boards supported at their ends only by said posts by means attached to the faces of the posts, the intermediate portions of said boards being adapted to flex laterally, and upright boards extending across and connecting said fence boards together intermediately of their length, said upright boards being movable laterally with the flexing of said fence boards.

7. A rectangular pen for confining animals comprising a plurality of upright posts, pairs of vertical strips spaced apart and secured to opposite faces of adjoining posts, fence boards having their ends fitting between the strips of each of said pairs and supported thereby, and means connecting said boards together intermediately of their length.

8. A pen for confining animals comprising upright posts, pairs of vertical strips spaced apart and secured to opposite faces of adjoining posts, fence boards having their ends fitting between the strips of each of said pairs and supported thereby, means connecting said boards together intermediately of their length, and truss members extending over the tops of said posts and connected therewith, said truss members being composed of parallel rails spaced apart to receive the upper ends of the posts between them, and horizontally disposed planks secured upon said rails.

9. A pen for confining animals comprising upright posts having upwardly projecting tenons and shoulders at their upper ends, pairs of vertical strips spaced apart and secured to opposite faces of adjoining posts, fence boards having their ends fitting between the strips of each of said pairs and supported thereby, means connecting said boards together intermediately of their length, and truss members extending over said posts and fence boards, said truss members being composed of parallel rails spaced apart to receive said tenons between them, the ends of said rails being supported by said shoulders, and horizontally disposed planks secured on said rails.

10. A rectangular pen for confining animals comprising a plurality of upright posts each having a flat top and a square tenon projecting upward therefrom, walls comprising spaced boards butted against opposing faces of said posts, means attached to said faces for holding said boards thereagainst, a pair of parallel rails laid on top of said posts and against said tenons, means for clamping said rails to said tenons, said vertical boards attached to said rails and fence boards midway between said posts.

11. A rectangular pen for confining animals comprising a plurality of upright posts each having a flat top and a square tenon projecting upward therefrom, walls comprising spaced boards butted against opposing faces of said posts, means attached to said faces for holding said boards thereagainst, a pair of parallel rails laid on top of said posts and against said tenons, spacing blocks between said rails and on opposite sides of said tenons and cooperating with the rails to form mortises into which the tenons are fitted to hold the rails on the post, and vertical boards attached to said rails and fence boards midway between said posts

WILLIAM S. WITTEN.

CERTIFICATE OF CORRECTION.

Patent No. 1,807,188.  Granted May 26, 1931, to

WILLIAM S. WITTEN.

It is hereby certified that error appears in the printed specification of the above numbered patent requiring correction as follows: Page 5, line 76, claim 2, after the word "comprising" insert the words a plurality of; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.